United States Patent [19]
Oehler

[11] 3,824,463
[45] July 16, 1974

[54] INDUCTANCE TYPE VELOCITY MEASURING APPARATUS

[75] Inventor: Kenneth L. Oehler, Pflugerville, Tex.

[73] Assignee: Oehler Research Incorporated, Austin, Tex.

[22] Filed: June 23, 1972

[21] Appl. No.: 265,530

[52] U.S. Cl. .............................. 324/179, 73/167
[51] Int. Cl. ............................................ G01p 3/66
[58] Field of Search ......... 73/167; 346/38; 324/178, 324/179, 180

[56] References Cited
UNITED STATES PATENTS

| | | | |
|---|---|---|---|
| 2,617,023 | 11/1952 | Weller | 328/5 |
| 3,015,077 | 12/1961 | Elam et al. | 324/179 |
| 3,127,768 | 4/1964 | Mason | 73/167 |
| 3,368,391 | 2/1968 | Harrison et al. | 73/57 |
| 3,659,201 | 4/1972 | Vogelsang | 324/179 |

*Primary Examiner*—Alfred E. Smith
*Assistant Examiner*—Rolf Hille
*Attorney, Agent, or Firm*—Roylance, Abrams, Berdo & Kaul

[57] ABSTRACT

A shot cluster velocity measuring apparatus in which the coils through which the shot is to sequentially pass are mounted in axially spaced relation and are electrically connected as frequency determining elements in a high frequency oscillator, the output of which is frequency modulated as the shot cluster passes the coils. An FM discriminator generates an amplitude varying signal representative of the frequency modulation. A differentiating and filtering circuit shapes the discriminator output which is then amplified. The gain of a variable gain amplifier is automatically adjusted to equalize signal amplitude, and a Schmitt trigger produces rectangular pulses. If the pulses out of the trigger are of sufficient duration they are used to produce "start" and "stop" signals, indicating the passage of the center of mass of the projectile or projectile cluster through the first and second coils, respectively. These signals are then used to control an interval timer which displays the count as a measure of velocity.

2 Claims, 5 Drawing Figures

INDUCTANCE TYPE VELOCITY MEASURING APPARATUS

This invention relates to apparatus for detecting the passage of an object through two spaced points and to means for accurately timing the interval taken for the object to pass from one point to the other. More specifically, the invention relates to apparatus for measuring the transit time of a fired projectile, or cluster of projectiles, between two such points.

It has become customary in the industries related to the manufacture of arms and ammunition to evaluate them by analysis including firing a projectile through a device for measuring the projectile velocity. One common technique is to provide two coils, axially spaced apart, through which a projectile or, in the case of a shot gun, a group of projectiles of shot, are propelled successively through one coil and another.

Electronic equipment is used to sense the passage through the coils and to measure the interval therebetween, yielding velocity information by simple well-known physical relationships.

A particular example of such apparatus is presented in U.S. Pat. No. 2,617,023, Weller, wherein a good fundamental discussion of the principles of such apparatus appears. In addition to the material given therein, it will be noted that an industry standard has become to space the muzzle of the weapon approximately 18 inches from the first coil and to maintain a fixed spacing of 36 inches between coils, the coils themselves having an inner diameter of approximately three inches.

While the Weller patent deals in general with the velocity measuring apparatus it is, apparently, primarily directed to problems dealing with a single projectile and does encounter certain noise problems as described therein.

The practical problems of measuring average or minimum velocity of a shot cluster projected from a shot gun is somewhat different than that of a bullet because, quite simply, of the difference in characteristics of the two types of projectiles.

First, it will be observed that a bullet remains substantially the same, at least within the initial six feet of distance after it leaves the muzzle, in size and shape. By contrast, a shot cluster not only changes size but also changes shape and, generally speaking, becomes as much as 50 percent longer as it passes through the span between the two coils. An entering cluster might extend in length for four inches whereas the cluster departing the second coil might be as long as six inches. Additionally, there is substantially greater variety in the nature of shot clusters in that various sizes and numbers of projectiles can be used in a cluster in addition to the variations in materials. It will be recognized that different materials produce different inductive effects and therefore alter the circuit characteristics differently.

Accordingly, it is an object of the present invention to provide an improved apparatus for measuring the velocity characteristics of groups of projectiles, and single projectiles, passing through to spaced coils, A further object is to provide an apparatus in which the measurement accuracy is substantially improved and which is highly immune to the effects of external noise signals, both sonic and electrical.

Yet another object is to provide an apparatus which is capable of being used to measure characteristics of single as well as multiple projectiles and which can be readily adjusted to measure characteristics of projectiles or projectiles clusters having different characteristics such that the results obtained from different tests with differing materials, and the like, can be meaningfully compared.

A still further object is to provide an apparatus as above described which is simple and reliable and is simple to use.

Briefly described, an apparatus in accordance with the present invention includes two spaced coils of conventional type, the two coils being connected in parallel circuit relationship with each other and with a conventional high frequency oscillator. The oscillator is connected to the coils so that passage of a projectile through the coils causes a frequency change in the oscillator, which frequency change is then discriminated in the nature of a frequency modulated signal, the output of the discriminator being an amplitude varying signal, the amplitude variations of which represent the frequency variations in the oscillator. The resulting electrical signal is amplified and provided to a trigger circuit which produces an output pulse having a time characteristic representative of the occurrence of the peak of the previously processed signal. The resulting pulse is permitted to pass, if it is of sufficient duration, to represent a projectile information signal as distinguished from an electrical noise signal. A pulse is produced for each coil and the interval between equivalent points on the pulses is measured and presented as being a measure of the time interval between passage of the projectile or projectile cluster through the two coils.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
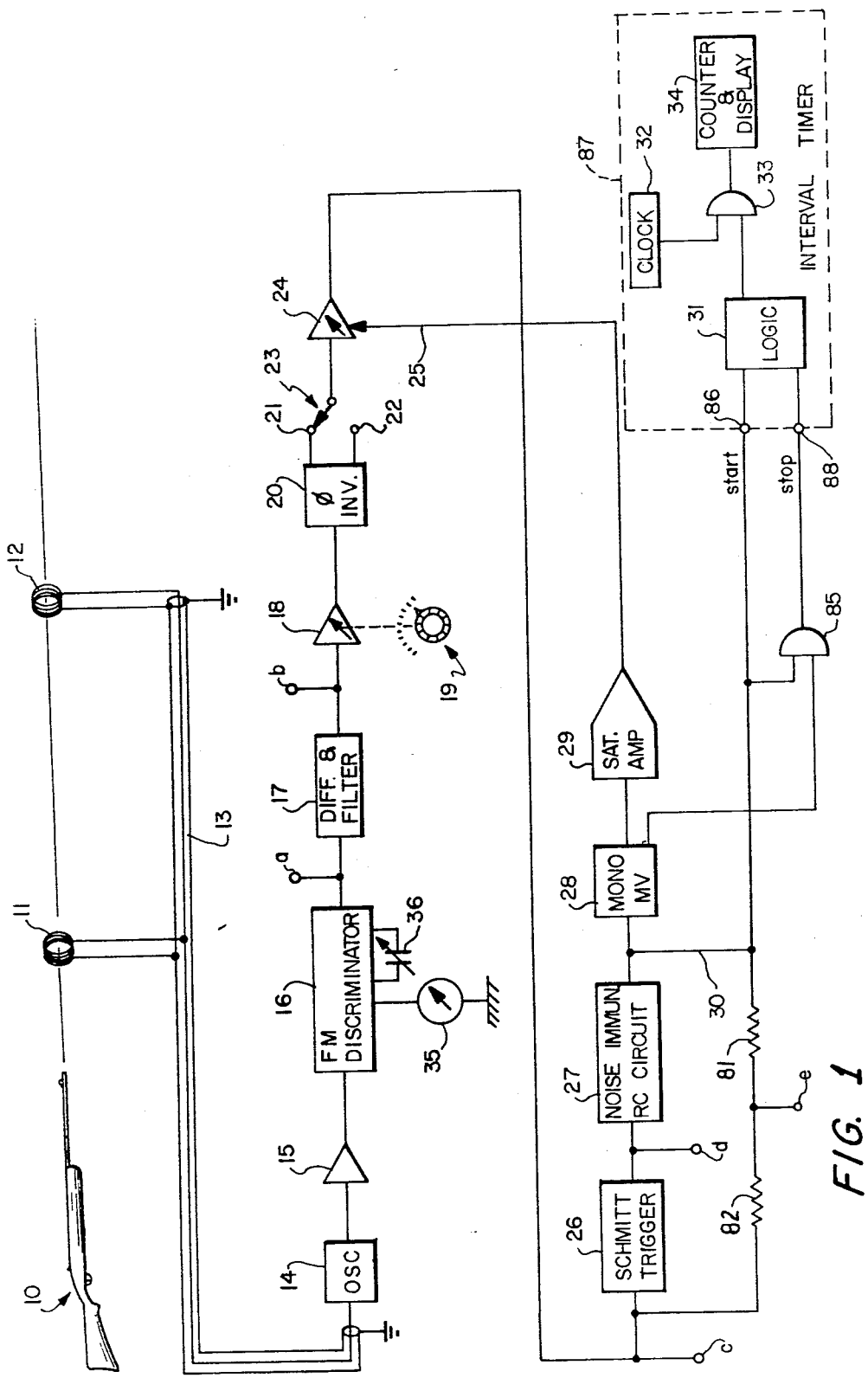
FIG. 1 is a schematic diagram, in block form, of an apparatus according to the invention.
Figure 4:
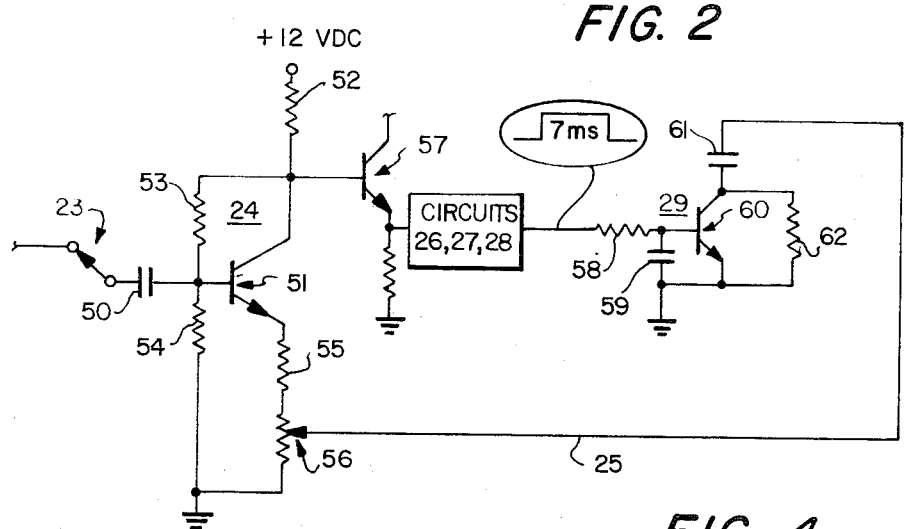
Figure 5:
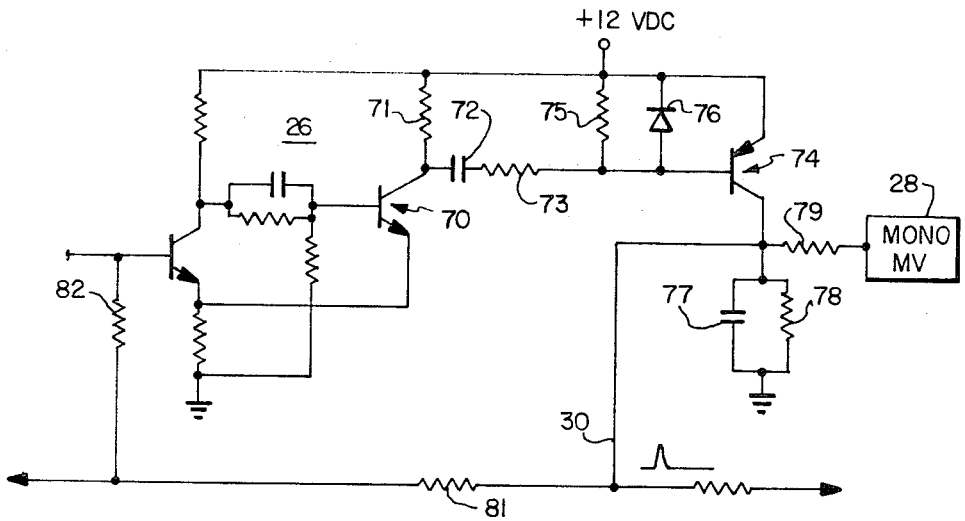

FIG. 3a–e shows a plurality of waveforms typical of various points in the apparatus of FIG. 1;

FIG. 4 is a schematic diagram of a variable gain amplifier and gain control means usable in the apparatus of FIG. 1; and FIG. 5 is a schematic diagram of a trigger circuit and noise immunizing circuit usable in the apparatus of FIG. 1.

Referring now to the drawings in detail, it will be seen that FIG. 1 illustrates a weapon, indicated generally at 10, which is being fired through the centers of two coils 11 and 12, which coils typically have the dimensions and spacing heretofore referred to. The ends of the wires of coils 11 and 12 are connected to the center and shield, respectively, of a two conductor cable 13 in parallel circuit relationship and to an oscillator 14. Oscillator 14 is typically an LC oscillator of which coils 11 and 12 form an integral part of the frequency determining circuit. Any conventional stable oscillator can be used and, for best results, can be said to operate at a relatively high frequency in the order of, for example, 3.7 MHz.

The output of oscillator 14, which output is a frequency modulated signal after a projectile or projectile cluster has passed through coils 11 and 12, is amplified by a conventional amplifier 15 and applied to the input of an FM discriminator 16. As will be familiar to those skilled in the art, the FM discriminator produces an amplitude varying signal which varies in proportion to the modulations of the frequency applied to the input thereof, this output being applied to the input of a differentiating and filtering circuit 17.

A meter 35 can be connected to discriminator 16 so that an analog visual monitor of the discrimated FM signal is available, the meter typically being of the center zero variety so that the direction of frequency variation as well as the action thereof can be observed. A tuning capacitor 36 can be provided for initial tuning, which tuning can be accomplished by setting the meter reading (no shot) to zero, indicating that the center frequency of the discriminator corresponds to the natural frequency of the oscillator.

The differentiating and filtering circuit 17 performs the function of a wave form shaping circuit for the purpose of modifying the output of the FM discriminator to be more easily analyzed as will be described hereinafter. The output of circuit 17 is applied to the output of a variable gain amplifier 18, the gain of amplifier 18 being adjustable manually, as by a control indicated schematically at 19, for the purpose of establishing a threshold level depending upon the material and nature of the projectile or projectile cluster being analyzed.

The output of amplifier 18 is connected to a phase inverting or phase splitting circuit 20 which has a direct output 21 and an inverted output 22. It will be recognized that certain types of shot made of, for example, lead, will cause the frequency of oscillator 14 to vary in one direction while shot made of a ferromagnetic material will cause a frequency variation in the opposite direction. This will result in signals of opposite polarities emanating from discriminator 16. To avoid having duplicate circuitry in the remaining apparatus, an an inversion switch and circuit is provided whereby either a direct or an inverted output can be supplied by manually actuating a single-pole double-throw switch indicated generally at 23 to select one of outputs 21 and 22.

The selected signal is applied to the input of a variable gain amplifier 24, which amplifier establishes a gain slope dependent upon a control signal applied to a gain control input terminal on a conductor 25. The source of the signal applied on conductor 25 will be described hereinafter.

The output of amplifier 24 is applied to the input of a conventional Schmitt trigger circuit 26 which is capable of producing a rectangular pulse as an output in response to the application of a varying input which crosses, in succession, positive and negative going thresholds established therein. The pulse output of circuit 26 is applied to a noise immunizing RC circuit 27, the output of which constitutes the basic "start" signal for the time measuring apparatus. This start signal is applied to a monostable multivibrator circuit 28, the output of which is applied to saturable amplifier circuit 29 which supplies a gain control signal on conductor 25 to variable gain amplifier 24.

It will be observed that the output of circuit 27, which appears on conductor 30, constitutes both the "start" and "stop" signals on this same conductor, and that it is possible to simply carry that conductor to an interval measuring apparatus which is capable of responding to the two signals and determining the interval between equivalent points thereon. However, it is also possible to separate the start and stop signals using monostable circuit 28 and a logic circuit 85 to separate them for further processing. Whichever is the case, interval timing logic is used to control the pulses emanating from a source of clock pulses such as 32 and gate those pulses such as in gate 33 to a counter and display apparatus 34 which can be calibrated to directly display the velocity of the projectile or projectile cluster measured between coils 11 and 12.

It will be seen from the foregoing general description of the apparatus that there are several different areas in which improvements have been made in the operation of apparatus to perform this general measuring function, and that the accuracy resulting from such improvements constitutes a dramatic step forward in the art. First, it will be observed that the use of the oscillator and frequency discriminator to derive the desired information from the frequency modulated oscillator output substantially eliminates all amplitude modulation characteristics and removes many of the noise problems which have traditionally existed in apparatus of this type. The differentiating and filtering circuit receives this discriminated signal and shapes the signal in accordance with certain frequency characteristics thereof.

Figure 2:
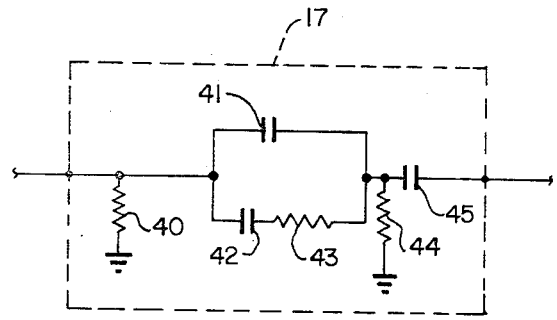
FIG. 2 is a schematic diagram of a differentiating and filtering circuit of the apparatus of FIG. 1.

The differentiating and filtering circuit 17 is disclosed in greater detail in FIG. 2 wherein it is seen that the signal from discriminator 16 is applied to a shunt resistor 40 and to one terminal of each of two capacitors 41 and 42 which are connected in parallel circuit relationship. A resistor 43 is connected in series circuit relationship with capacitor 42, the two parallel circuits being connected to a shunt resistor 44 and a series capacitor 45, from which the signal is applied to the input of amplifier 18.

As will be seen, the series impedance of capacitor 42 and resistor 43 passes the signal into the shunt resistor 44 without significant change in wave shape. The capacitor 41 passes a signal approximating the time derivative of the input signal into the shunt resistor 44. These two signals summed at the junction of resistor 44 and capacitor 45 are substantially equal to each other in peak amplitude within the frequency spectrum of interest and provide a composite output signal with steeper wave edges and a more clearly defined shape. Capacitor 45 drives the high input impedance of amplifier 18 without significant additional change in wave shape. Thus, the wave form emanating from the discriminator is shaped in a manner which permits it to be more easily analyzed without losing the fundamental characteristics of the wave shape.

Figure 3:
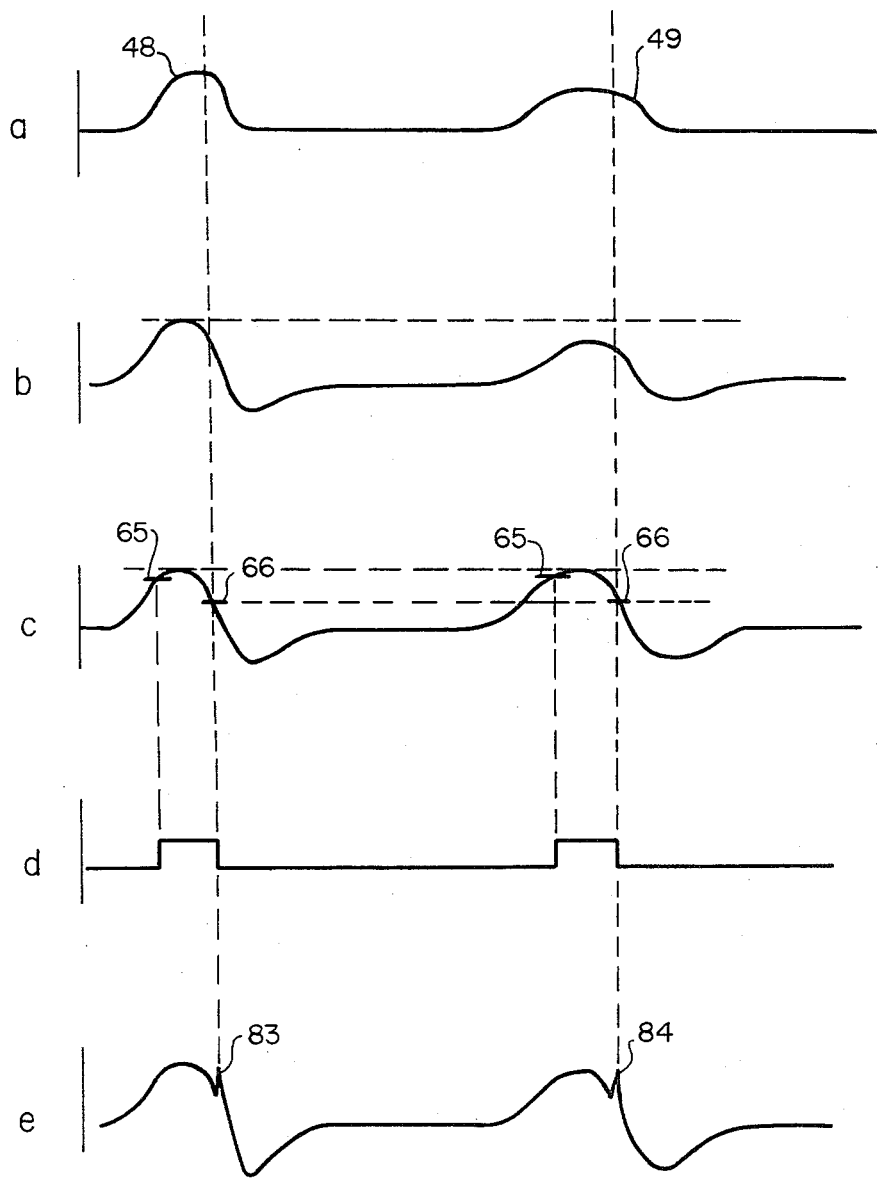

At this point, it may be helpful to refer to FIG. 3 which shows, in portions a–e, typical wave forms which appear at various points in the apparatus of FIG. 1. It will be observed in the circuit of FIG. 1 that there are test points with letters corresponding to the wave forms in FIG. 3, these points being those at which the wave forms can typically appear.

For example, FIG. 3a shows a typical output of discriminator 16 in which a rather broad pulse 48 indicates a frequency variation resulting from the passage of a shot cluster through coil 11, and an even broader pulse 49 illustrates a signal resulting from the subsequent passage of the same shot cluster through coil 12. It will be observed that wave form 49 is typically broader and of lower amplitude than 48, this difference resulting from the fact that the shot cluster normally spreads out, in a lengthwise direction, as the distance from the weapon muzzle increases. This produces a smaller variation in frequency, but one which lasts for a longer time. It will also be recognized that, in attempting to obtain a measurement between the times when the center of mass of the shot cluster passes through one coil and then the other, it is desirable to eliminate differences which arise from the change in shot cluster shape such as that which naturally arises in the output of the discriminator.

The wave form of FIG. 3b shows the differentiated and filtered wave form emanating from the circuit of FIG. 2, the wave form being seen as a more peaked wave form in each case but still with a significant amplitude difference.

In order to dispense with this difference between the amplitude in the wave forms of FIG. 3b, the signal is applied to variable gain amplifier 24 which, under the control of the signal applied on conductor 25, varies the gain between the arrival of pulse 48 and the arrival of pulse 49, increasing the gain during that interval to the extent necessary to produce an input signal for Schmitt trigger 26 which includes two pulses of very nearly equal amplitude. By this technique, the Schmitt trigger can be set to respond to signals exceeding a single threshold and it is not necessary to individually analyze the two pulses with different equipment.

The manner in which the equalization of the amplitudes of the two pulses is accomplished by the variable gain amplifier and its control can be seen in the more detailed schematic diagram of FIG. 4 wherein the variable gain amplifier 24 and the saturable amplifier 29 are shown in detail and the intervening circuits are indicated by a single block. As shown therein, the input to amplifier 24 is connected to the movable contact of switch 23, the signal being coupled into the amplifier through a capacitor 50 to the base electrode of a conventional NPN transistor indicated generally at 51. The collector of transistor 51 is connected through a fixed resistor 52 to a positive DC voltage source and, through a fixed resistor 53, to the base. A fixed resistor 54, connected between the base and ground, completes the base bias arrangement.

The emitter electrode is connected to ground through a series circuit including a fixed resistor 55 and the resistance element of a potentiometer 56. The movable contact of potentiometer 56 is connected to conductor 25 which carries the gain control signal.

The output of the variable gain amplifier is taken from the oscillator of transistor 51 and coupled through an emitter follower amplifier, indicated generally at 57, to circuits 26, 27 and 28 which need not be discussed in detail at this stage except to note that the output of circuit 28 is a positive going pulse of approximately 7 milliseconds duration. That positive pulse is coupled to the input of saturable amplifier 29 through a resistor 58 to the base electrode of a conventional NPN transistor indicated generally at 60. A capacitor 59 is connected between the base and ground. The emitter electrode of transistor 60 is connected to ground and the collector electrode is connectethrough a relatively large capacitor 61 to conductor 25, and through a fixed resistor 62 to ground.

The relative values and time constants of certain portions of this circuit are of some importance. Resistor 58 and capacitor 59 are selected so that a small delay, less than one millisecond, occurs before the leading edge of the pulse output of monostable 28 takes effect. After that delay, transistor 60 is driven into conduction and saturates rapidly. Capacitor 61, which can be on the order of 50 microfarads, then couples the movable contact of potentiometer 56 through transistor 60 to ground, significantly diminishing the impedance of the emitter circuit of transistor 51. Thus, immediately following the initial one millisecond delay, the impedance of the emitter circuit of transistor 51 is lowered, causing the gain of amplifier 24 to be increased. The amount of increase which is accomplished by this change is a linear function of the setting of the movable contact of potentiometer 56, but the gain increase, in any event, occurs before the arrival of pulse 49 and increases the amplitude of that pulse to very close to the amplitude of the preceding pulse as illustrated in FIG. 3c.

At the end of the 7 millisecond pulse output of monostable circuit 28, transistor 60 is again returned to its non-conductive state, putting capacitor 1 in series circuit relationship with resistor 62, resistor 62 being selected to be substantially larger than the resistance element of potentiometer 56, thereby essentially removing capacitor 61 from the circuit and permitting it to discharge. As will be recognized, the duration of the pulse output of monostable 28, 7 milliseconds, is selected to be longer than the longest interval of time which would be expected to be occupied by a projectile cluster passing between coils 11 and 12.

It is now appropriate to turn to the Schmitt trigger circuit which responds to the output of amplifier 24 by producing a substantially rectangular impulse in response to each input signal of the type shown in FIG. 3c which exceeds the threshold for which the Schmitt trigger is biased. The trigger circuit has two separate, although not totally independent, thresholds, one being an input threshold which, when crossed by the input signal, produces the leading edge of an output pulse. The second threshold is that to which the circuit responds when the input signal crosses it at the trailing edge to produce the trailing edge of the output signal. In FIG. 3c the threshold initiating the output impulse is shown at 65 and the threshold terminating the output pulse is shown approximately at 66. Threshold 65 is selected to be a value just below the anticipated peak value of the signal emerging from amplifier 24 in its lower gain state, and the threshold value of 66 is selected to be approximately midway between the peak value and the gross average value of the signal. It will be recognized that it is not possible, in the case of any specific signal, to predict the level to which the signal will rise until it has done so. Thus, these thresholds are used to bracket this peak value, rejecting any signals which do not rise thereto and providing an output which straddles the peak when the signal does reach its anticipated maximum. Sufficient anticipation and shaping is introduced by differentiating circuit 17 so that threshold 66 (midway on the downslope) will represent a time corresponding to the center of the peak of the input signal. Thus, a measurement from (or to) that threshold constitutes a measurement from (or to) the center of the peak, which peak center represents the center of mass of the cluster of pellets in the shot. Establishing these thresholds also eliminates a substantial amount of transient and noise signals which might otherwise interfere with the measurement operation.

The Schmitt trigger, having responded between the thresholds above described, produces two output pulses somewhat as illustrated in FIG. 3d. This output is delivered to the noise immunizing RC circuit 27, the purpose of which is to reject any input signals which are of sufficient magnitude to cause the Schmitt trigger circuit to produce an output pulse, but which are of such a limited duration as to be clearly not in the category of an authentic input signal. An example of such a signal is a high voltage, short duration inductive peak which might be produced by a stray field signal.

A suitable immunizing circuit for this purpose is shown in FIG. 5 wherein the Schmitt trigger 26 is of conventional design and includes, at its output, a conventional NPN transistor indicated generally at 70 having its collector connected through a fixed resistor 71 to a positive fixed DC voltage supply. At the junction of the collector and resistor 71 is a series circuit including a capacitor 72 and a fixed resistor 73 which is connected to the base electrode of a conventional PNP transistor indicated generally at 74. The parallel circuit of a fixed resistor 75 and a diode 76 is connected between the base electrode of transistor 74 and the positive supply, the emitter electrode of transistor 74 also being connected to the positive supply. The collector electrode of transistor 74 is connected through a parallel circuit including a capacitor 77 and a resistor 78 to ground, and through a fixed resistor 79 to the input of multivibrator 28.

The noise immunizing circuit is designed so that transistor 74 is normally maintained in a nonconductive state by the positive potential on both emitter and base of the transistor. Transistor 70 is normally conductive until the Schmitt trigger responds to an input signal, thereby placing capacitor 72 in a highly charged condition. When the Schmitt trigger reverses condition in response to an input signal, transistor 70 is placed in a non-conductive state, permitting the capacitor to be discharged through the circuit including resistors 71 and 73 and diode 76. The time constant is selected so that the capacitor will be sufficiently discharged to momentarily place transistor 74 in a conductive state when transistor 70 returns to the normal conductive state, but only if the nonconductive output state exists for a predetermined, relatively long duration. Thus, noise spikes are rejected and the remaining apparatus is rendered substantially more immune to noise input signals.

It should be noted that the output at the collector of transistor 74 is a spike of relatively short duration which constitutes the start output signal as previously described. Also, this signal is combined with the signal appearing in FIG. 3c, through resistors 81 and 82, to generate the wave form shown in FIG. 3e. That wave form constitutes a monitoring signal which can be applied to an oscilloscope to adjust the various portions of the circuit to proper operating condition.

Specifically, it will be noted that the position of the impulses 83 and 84 in FIG. 3 occur at the level and time location of threshold 66. In actuality, threshold 66 is adjusted by connecting an oscilloscope to the monitoring point to observe wave form 3e and circuit constants, specifically the gain of amplifier 18 and the movable contact or potentiometer 56, can be manually adjusted to establish the relative amplitudes and levels of the input signals and threshold values so that the Schmitt trigger will respond to the appropriate point on the trailing edge of the wave form. It will be recognized that a Schmitt trigger is usually thought of as a circuit which is adjusted to accommodate a specific signal, but that it is perfectly consistent, whenever possible, to fix the values of the Schmitt trigger and to adjust the amplitude and level values of the signal so that the desired coincidence occurs at the appropriate point in real time.

Turning now to the handling of the output signals as shown in FIG. 1, the start signal which appears on conductor 30 is connected to one input of a conventional AND gate 85 and to an input terminal 86 of an interval timer 87 which includes logic circuit means 31 and the clock, gate and counter and display unit previously discussed. Also as previously described, one output of multivibrator 28, which can be referred to as the "direct" output, is connected to saturable amplifier 29 and the inverse output is connected to the other input of gate 85. Thus, multivibrator 28, through its inverse output, disables gate 85 except during the seven millisecond interval following the start pulse, during which interval gate 85 is enabled so that the stop pulse appearing on conductor 30 can be gated through to the stop input 88 of the interval timer.

While one advantageous embodiment has been chosen to illustrate the invention, it will be understood by those skilled in the art that various changes and modifications can be made therein without departing from the scope of the invention as defined in the appended claims.

What is claimed is:

1. In an apparatus for measuring elapsed time of travel of a projectile between two spaced points, the apparatus being of the type having first and second reactive elements located at the spaced points, and wherein the projectile constitutes a cluster of a plurality of pellets having a characteristic shape at said second point different from its shape at said first point, the improvement comprising an oscillator;

circuit means for connecting the reactive elements to said oscillator as frequency determining elements thereof;

discriminator circuit means coupled to said oscillator for producing varying electrical signals representative of variations in frequency of said oscillator as a result of the passage of the projectile by the reactive elements;

means coupled to said discriminator circuit means for producing first and second substantially rectangular impulses representative of the signal variations;

means for amplifying the signal output of said discriminator circuit means;

means for changing the gain of said means for amplifying between the amplification of the signal resulting from the passage of the projectile by the first reactive element and the signal resulting from the passage of the projectile by the second element; and means for measuring the elapsed time between the occurrence of selected points on said rectangular impulses.

2. An apparatus for measuring the time interval occupied by a projectile in travelling a known distance along a line between two points comprising the combination of first and second inductive coils mounted at said two points surrounding the line;

circuit means for connecting said coils as frequency determining elements of said oscillator so that the passage of the projectile through a coil causes the frequency of the oscillator to temporarily change;

frequency disciminator means connected to the output of said oscillator for producing a signal representative of the time at which the projectile passed through each coil;

filter circuit means for emphasizing a selected characteristic of the signals produced by said discriminator means;

means for amplifying the filtered signals by different amplification factors;

trigger circuit means for producing a rectangular output pulse in response to each amplified signal;

circuit means for producing a brief impulse representative of the trailing edge of each rectangular pulse having a pulse duration in excess of a predetermined time;

means responsive to the first said impulse for producing a control signal to change the amplification factor of said means for amplifying; and means for measuring the time interval between said impulses.

* * * * *